United States Patent [19]

Welle

[11] 4,138,795
[45] Feb. 13, 1979

[54] SLIDING SINKER

[75] Inventor: Glen R. Welle, Minden, La.

[73] Assignee: Mister Twister, Inc., Minden, La.

[21] Appl. No.: 790,403

[22] Filed: Apr. 25, 1977

[51] Int. Cl.² ............................................. A01K 95/00
[52] U.S. Cl. ...................................... 43/44.89; 43/44.9
[58] Field of Search ................ 43/44.97, 44.89, 43.12, 43/18 R, 43.1, 44.9, 44.87, 42.74

[56] References Cited

U.S. PATENT DOCUMENTS

| | | | |
|---|---|---|---|
| 2,365,414 | 12/1944 | Kruse | 43/18 R |
| 2,428,497 | 10/1947 | Meek | 43/44.89 |
| 2,459,959 | 1/1949 | Pelmarsh | 43/44.89 |
| 2,577,549 | 12/1951 | Vice | 43/44.97 |
| 3,096,599 | 7/1963 | Baron | 43/44.87 |
| 3,280,498 | 10/1966 | Decker | 43/43.12 |

*Primary Examiner*—Nicholas P. Godici
*Assistant Examiner*—Roscoe V. Parker
*Attorney, Agent, or Firm*—Fishburn, Gold & Litman

[57] ABSTRACT

A sliding sinker combination for use on a fishing line between a fishing rod and a swivel includes a tubular member sleeved on the fishing line and movable along same. The sinker has an aperture through an ear extending from one end of a sinker body member with the tubular member positioned therein. The ear is defined by a finger or the like having an opening and is formed of bendable material so that the tubular member and fishing line may be pulled free in the event that the sinker body member is snagged thereby saving the fishing line, the swivel, and a fishing jig connected to the swivel.

5 Claims, 7 Drawing Figures

SLIDING SINKER

The present invention relates to a sliding sinker combination for use on a fishing line between a fishing rod and a swivel and more particularly to a sliding sinker combination which is releasable from the fishing line to save the fishing line and fishing items connected thereto.

The principal objects of the present invention are: to provide a releasable sliding sinker combination for use on a fishing line between a fishing rod and a swivel; to provide such a sliding sinker combination which is particularly useful in combination with a floating jig connected to the swivel; to provide such a sliding sinker combination which includes an open ear extending from a sinker body member and having a tubular member positioned in an aperture therethrough and with the fishing line extending through the tubular member; to provide such a sliding sinker wherein the ear has a free end and is formed of bendable material so that the ear aperture may be opened for removal of the tubular member and fishing line in the event that the sinker is snagged and thereby save the fishing line, swivel, and a fishing jig connected thereto; to provide such a sliding sinker combination wherein the tubular member is formed of resilient material so that the bendable ear clampingly compresses an exterior surface of the tubular member; to provide such a sliding sinker wherein the ear extends from the sinker body which includes first and second portions positioned to define an obtuse angle therebetween so that the sinker body is snag resistent; to provide such a sliding sinker wherein the ear extends from one end of the sinker body and is positioned relative to the sinker body first portion to define an obtuse angle therebetween whereby the sinker body trails the ear and tubular member; to provide such a sliding sinker wherein the sinker body increases in thickness and width from the ear toward the other end of the sinker body; and to provide such a sliding sinker combination which includes a sinker body which is easy to install on and remove from the tubular member and fishing line and which is economical to manufacture, durable in construction, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features of the sliding sinker combination.

Figure 1:
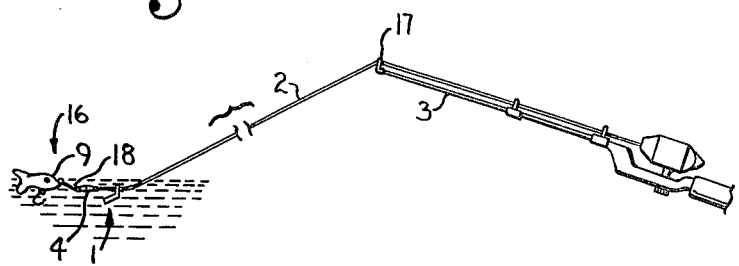
FIG. 1 is a side elevational view of a floater fishing rig embodying features of the present invention.
Figure 2:
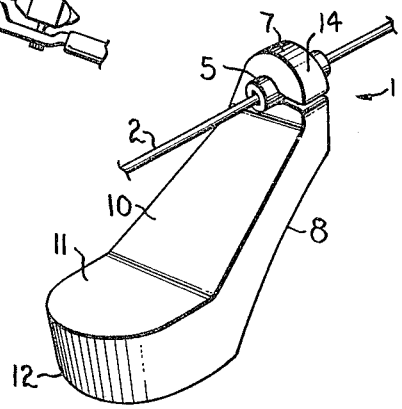
FIG. 2 is an enlarged perspective view of a sliding sinker combination for use in the floater fishing rig.
Figure 3:
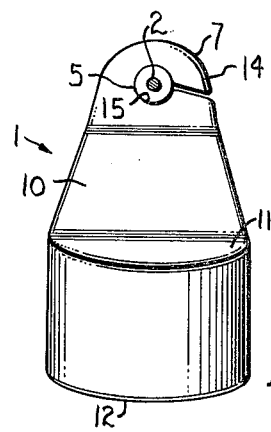
FIG. 3 is an enlarged front elevational view of the sliding sinker combination.
Figure 4:
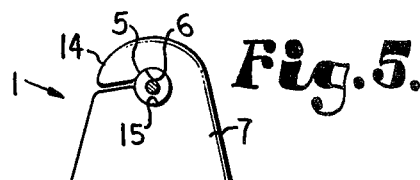
FIG. 4 is an enlarged side elevational view of the sliding sinker combination.
Figure 5:
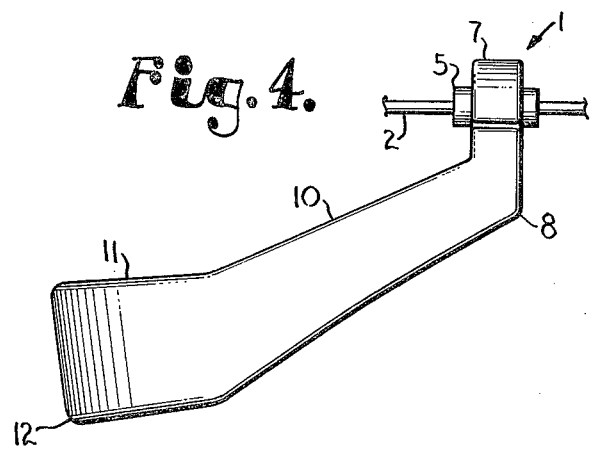
FIG. 5 is an enlarged and elevational view of one end of the sliding sinker combination and showing an ear retaining a tubular member in position.
Figure 6:
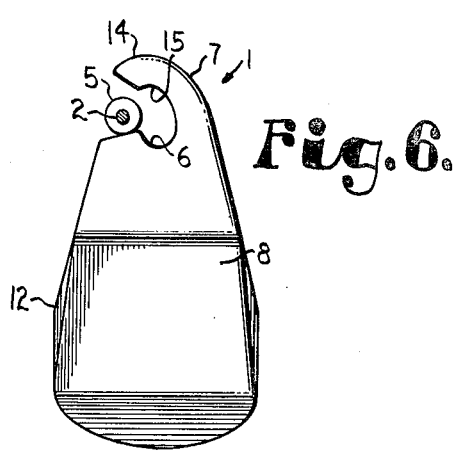
FIG. 6 is an enlarged end elevational view of the one end of the sliding sinker combination similar to FIG. 5 except showing the ear in a position releasing the tubular member and fishing line.
Figure 7:
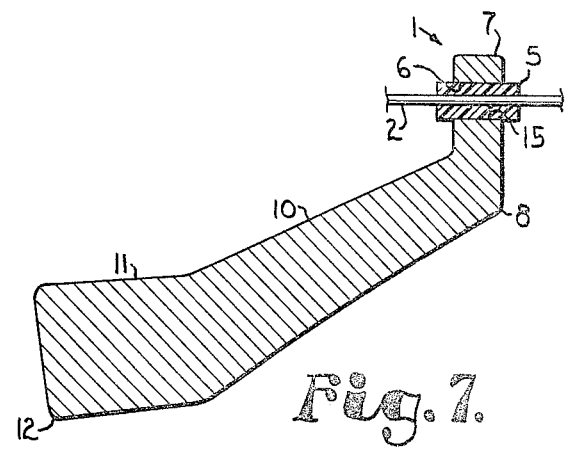
FIG. 7 is an enlarged longitudinal sectional view through the sliding sinker combination taken on line 7—7.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a sliding sinker combination for use on a fishing line 2 between a fishing rod 3 and swivel 4. The sliding sinker combination 1 includes a tubular member 5 sleeved on the fishing line 2 and movable along same. The tubular member 5 is positioned in an aperture 6 through an ear 7 extending from one end of a sinker body member 8. The ear 7 is of open form and is of bendable material so that the tubular member 5 and fishing line 2 may be pulled free in the event that the sinker body member 8 is snagged thereby saving the fishing line 2, swivel 4, and a fishing jig 9 connected to the swivel 4.

The sinker body member 8 is formed of a conventional weight material, such as lead, and increases in thickness and width from the ear 7. The sinker body member 8 includes a first body portion 10 with the ear 7 extending from one end thereof. The ear 7 and the first body portion 10 are positioned to define an obtuse angle therebetween.

The sinker body member 8 includes a second body portion 11 extending from the first body portion 10. The first and second body portion 10 and 11 are positioned to define an obtuse angle therebetween. A free end 12 of the second body portion 11 is preferably rounded so that the sinker body member 8 assumes a generally tear shape in front elevational view.

The ear 7 extends from the free end of the first body portion 10 and is an arcuate member having a free end 14. The ear 7 is positioned to define the aperture 6 therethrough. The ear 7 has one surface 15 thereof defining the aperture 6 and engageble with an exterior surface of the tubular member 5. The ear member 7 is preferably integral with the sinker body member 8 and is of a bendable material whereby the ear free end 14 may be selectively moved to move the one surface 15 of the ear 7 to clamp or release the tubular member 5 with the fishing line 2 extending therethrough.

The tubular member 5 is positioned in the ear aperture 6 and has an axis which is substantially coaxially aligned with an axis through the ear aperture 6. The tubular member 5 has a fishing line 2 extending therethrough so that the sinker combination 1 is movable along the fishing line 2. The tubular member 5 is formed of a resilient material, such as plastic or rubber, which will be indented by the ear 7 but which will not collapse when clamped by the ear 7.

The shape of the sinker body member 8 is such that the second body portion 11 thereof will be the first portion of the sliding sinker combination 1 to engage the obstruction or a bottom surface of a body of water.

The sliding sinker combination 1 is particularly useful in a floater fishing rig 16 as illustrated in FIG. 1. The fishing rod 3 may be any suitable conventional rod having one end thereof constructed to have a tip top 17 mounted thereon. The tip top 17 has an aperture therethrough so that the fishing line 2 may extend through the tip top aperture for casting. The swivel 4 may be any conventional construction and may include ball bearings. The swivel 4 has one end thereof connected to the fishing line 2. The fishing jig 9 has a line 18 connected to the other end of the swivel 4. The fishing jig 9 is preferably a float so that the sliding sinker combination 1 and the swivel 1 are well below the water surface.

During casting, the sliding sinker combination 1 will move along the fishing line 2 until at the lowest point in the fishing line. The floater fishing rig 16 illustrated in FIG. 1 and including the sliding sinker combination 1 is particularly useful when fish are slightly suspended off the bottom when the bottom is covered with debris or when fish are holding tight along an edge of a weed line. The floater fishing rig 16 including the sliding sinker combination 1 is especially adapted for back trolling with a boat moving in reverse into or at right angles to a current or a wind. The floater fishing rig 16 including the sliding sinker combination 1 provides maximum control and feel of the rig.

When the sinker body member 8 becomes snagged in weeds, debris, rock, or the like, a pull on the fishing line 2 vertically or toward the ear one surface 15 will move the ear free end 14 away from the body member 8 thereby opening the ear aperture 6 and permitting escape of the tubular member 5 and fishing line 2 so that the swivel 4 and fishing jig 9 are saved. The sinker body member 8 is considerably less expensive than the fishing line 2, swivel 4, and fishing jig 9.

It is to be understood that while I have illustrated and described one form of my invention, it is not to be limited to this specific form or arrangement of parts herein described and shown.

What I claim and desire to secure by Letters Patent is:

1. A sliding sinker combination for attachment to a fishing line comprising:
   (a) an integral sinker body member of formable weight material having an ear extending from one end thereof and defining an obtuse angle between said ear and body member;
   (b) said ear having an aperture therethrough with a narrow opening extending transversely through one side thereof communicating with said ear aperture;
   (c) a tubular member positioned in said ear aperture and coaxial thereof, said ear being formed to grip the tubular member to retain same therein with the narrow opening being substantially less than the diameter of the tubular member, said tubular member slidably receiving a fishing line therein whereby the sinker is movable along the fishing line.

2. A sliding sinker as set forth in claim 1 wherein:
   (a) said narrow opening provides the ear with a free end; and
   (b) said ear is of bendable material whereby said ear free end may be selectively moved to clamp and release said tubular member.

3. A sliding sinker as set forth in claim 2 wherein said tubular member is formed of resilient plastic material which is clamped in the ear without collapsing and thereby permits the line to move therein.

4. A sliding sinker as set forth in claim 1 wherein:
   (a) said body member includes a first portion with said ear extending therefrom;
   (b) said ear and said first body portion are positioned to define an obtuse angle therebetween;
   (c) said body member includes a second portion extending from said body member first portion; and
   (d) said body member first and second portions are positioned to define an obtuse angle therebetween.

5. A sliding sinker as set forth in claim 4 wherein:
   (a) said ear is an arcuate member and has a free end;
   (b) said ear has one surface thereof engageable with an exterior surface of said tubular member; and
   (c) said tubular member is of resilient plastic material and said ear is formed of bendable material whereby said ear free end may be selectively moved to move said one surface of said ear to clamp and release said tubular member.

* * * * *